Feb. 19, 1924.
L. T. JOHNSON
WEIGHING MECHANISM
Filed June 3, 1922
1,483,888
3 Sheets-Sheet 1
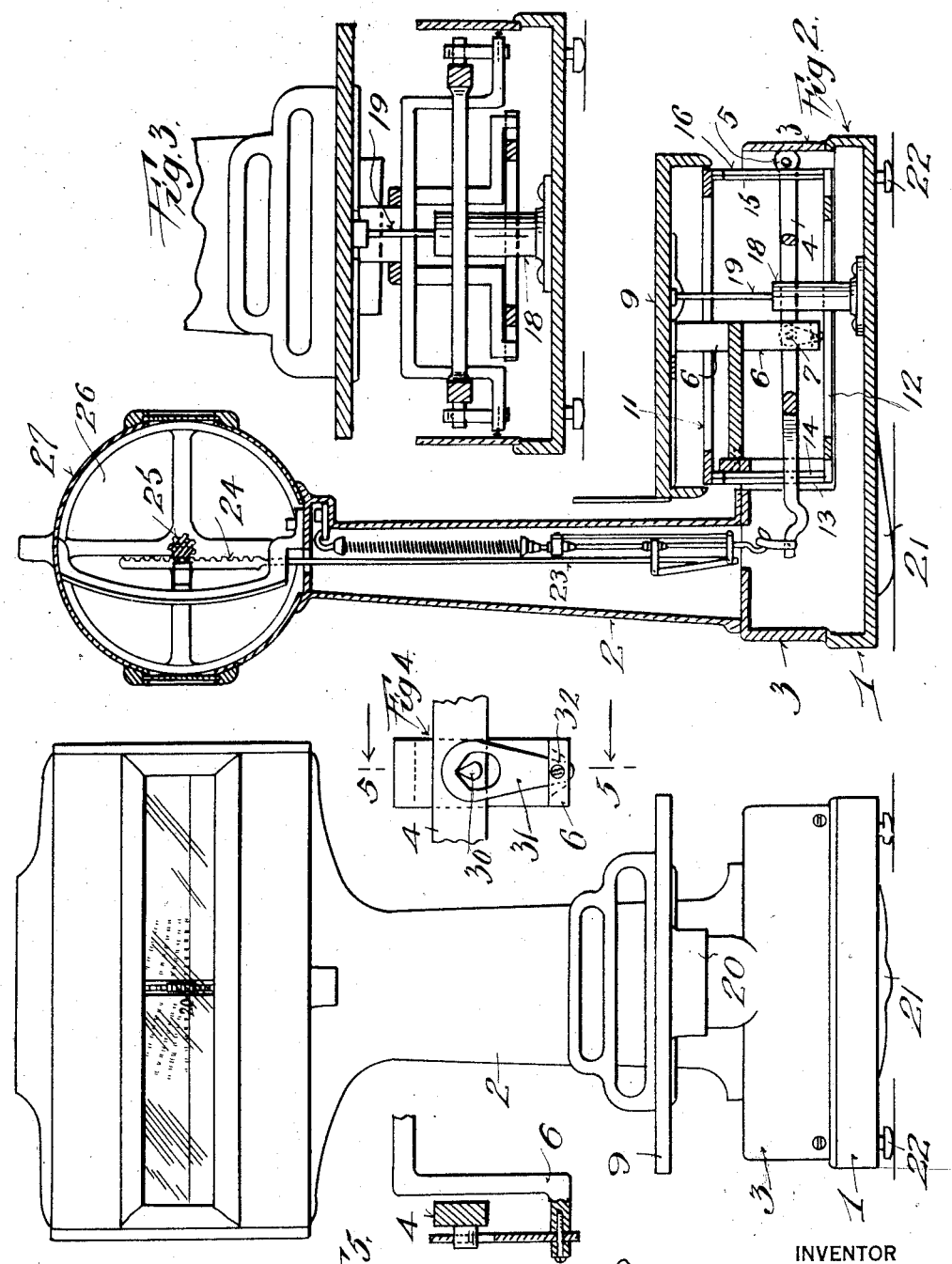

Feb. 19, 1924.
L. T. JOHNSON
WEIGHING MECHANISM
Filed June 3, 1922  3 Sheets-Sheet 2
1,483,888
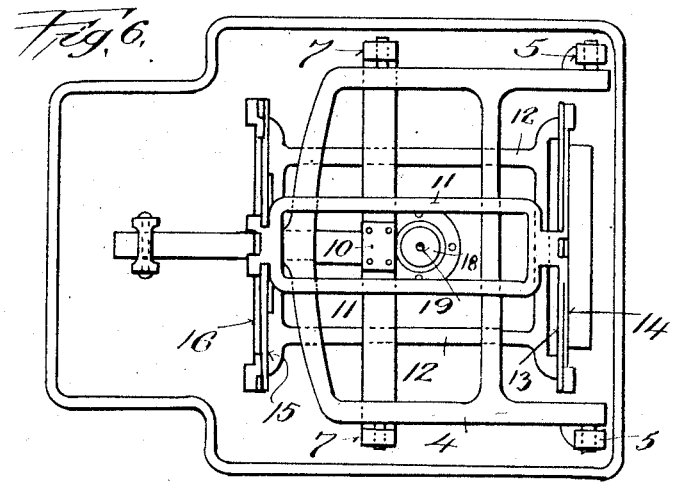
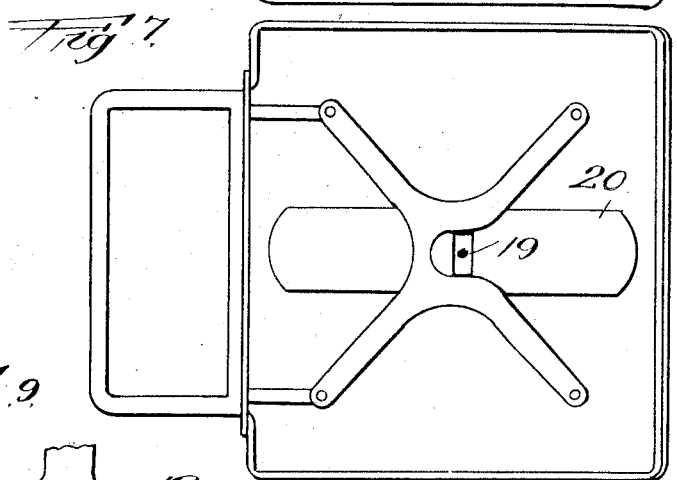
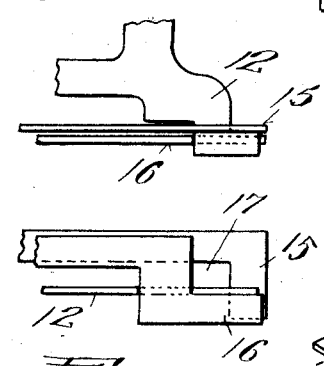
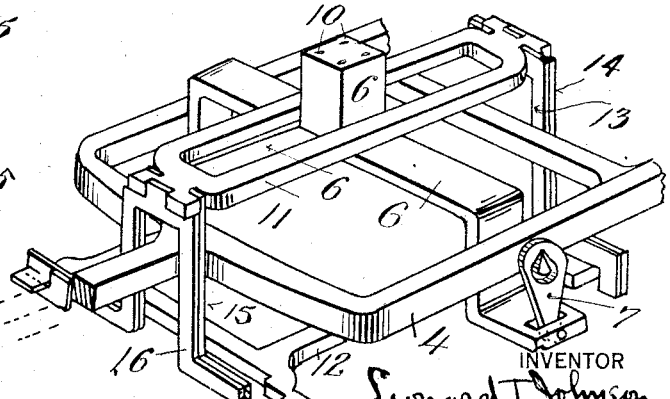

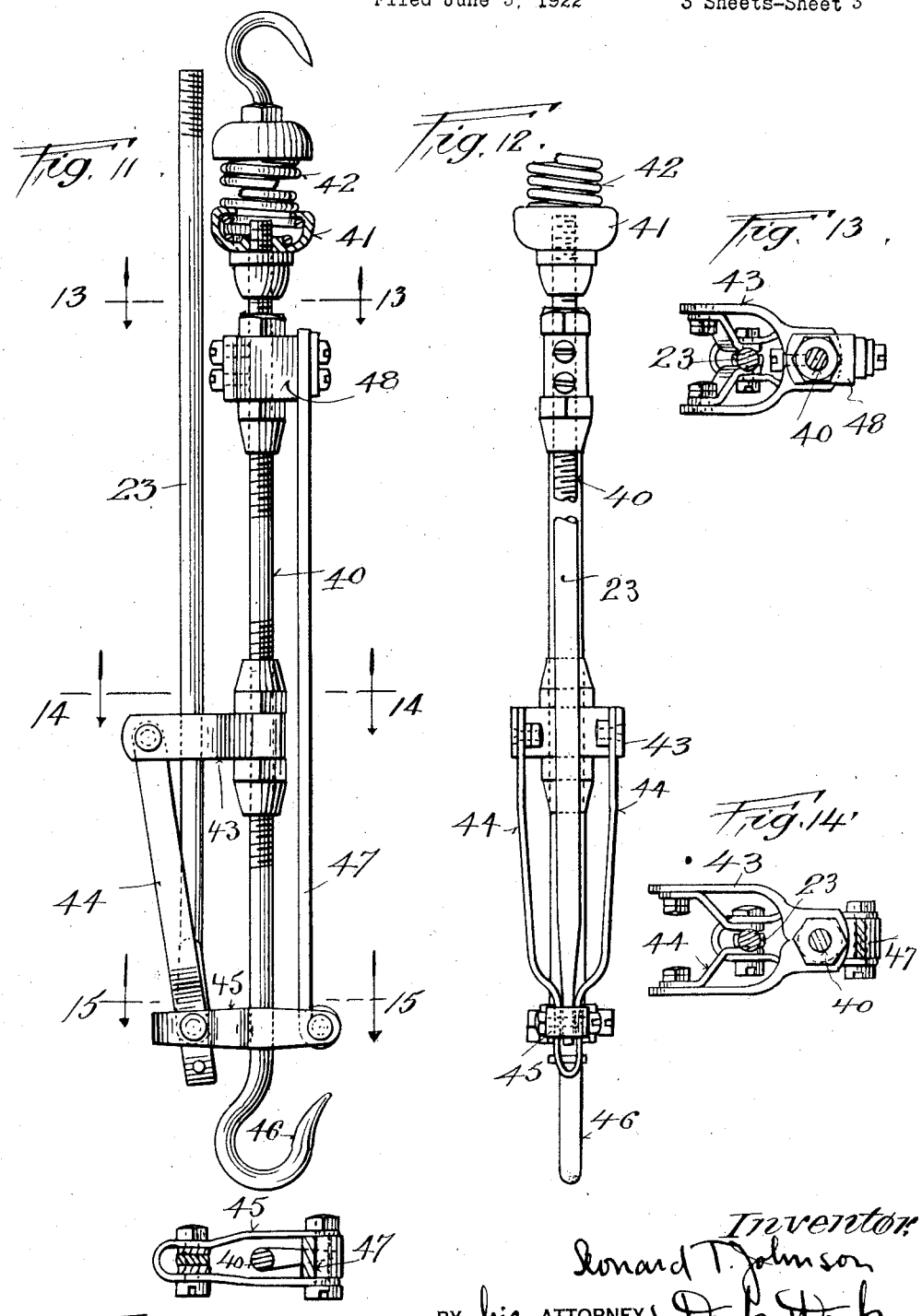

Patented Feb. 19, 1924.

1,483,888

UNITED STATES PATENT OFFICE.

LEONARD T. JOHNSON, OF JERSEY CITY, NEW JERSEY.

WEIGHING MECHANISM.

Application filed June 3, 1922. Serial No. 565,610.

*To all whom it may concern:*

Be it known that I, LEONARD T. JOHNSON, a citizen of the United States, residing at Jersey City, county of Hudson, State of New Jersey, have made a certain new and useful invention in Weighing Mechanism, of which the following is a specification.

This invention relates to weighing mechanism, and more particularly to such type of mechanism as is employed in visible scale structures.

The object of the invention is to provide a weighing mechanism which is simple in structure, efficient in operation, and economical of manufacture.

A further object of the invention is to provide in a scale structure a novel, efficient and economical form of lever arrangement.

A further object of the invention is to provide in a structure of the class described, a simple, efficient and economical thermostat for automatically maintaining the scale readings accurate notwithstanding temperature variations.

Further objects of the invention will appear more fully hereinafter.

The invention consists substantially in the construction, combination, location, and relative arrangement of parts, all as will be more fully hereinafter set forth, as shown by the accompanying drawings, and finally pointed out in the appended claims.

Referring to the drawings,—

Fig. 1 is a view in front elevation of a scale mechanism, embodying the principles of my invention.

Fig. 2 is a side view of the same in vertical section.

Fig. 3 is a front view of the same in vertical section.

Fig. 4 is a detail view in side elevation showing a form of pivot arrangement employed in acordance with my invention.

Fig. 5 is a sectional view taken on the line 5, 5, Fig. 4, looking in the direction of the arrows.

Fig. 6 is a top plan view of a lever mechanism employed in accordance with my invention.

Fig. 7 is a similar view of the platform employed in connection therewith.

Fig. 8 is a view in perspective of a lever mechanism employed in accordance with my invention.

Figs. 9 and 10 are respectively plan and elevation views showing a method of attachment of the respective levers employed in accordance with my invention.

Fig. 11 is a view in front elevation of a thermostat structure embodying the principles of my invention.

Fig. 12 is a rear view of the same.

Fig. 13 is a sectional view taken on the line 13, 13, Fig. 11, and looking in the direction of the arrows.

Fig. 14 is a similar view taken on the line 14, 14, Fig. 11, looking in the direction of the arrows.

Fig. 15 is a similar view taken on the line 15, 15, Fig. 11, and looking in the direction of the arrows.

The same part is designated by the same reference character wherever it occurs throughout the several views.

It is among the special purposes of my present invention to provide a scale mechanism wherein a most efficient leverage structure is afforded, and wherein an exceedingly simple, efficient and novel type of thermostat is employed.

Figs. 1 to 10 inclusive are directed especially to the leverage or check rod construction of the scale of my invention, including, of course, the housing for the same.

Referring particularly to Figs. 1, 2, and 3, reference numeral 1 designates a base casting on which the usual post 2, which contains the upwardly extending portion of the scale, rests. Similarly, the shell or lever cover 3 is supported by the base 1, and encloses the lever construction, to be hereinafter described. In the lever construction, the lever 4 is pivoted to the base 1, or to be more accurate, the portion 3 supported thereby, at the front end of the mechanism, by means of the usual pivot connection employed in scale mechanism of this nature indicated at 5. Lever 4 has attached thereto the frame 6, see Figs. 2 and 8, by means of pivoted agate bearings 7, which will be more fully hereinafter described. The platter plate 9 is supported by the frame 6 in the arrangement shown in Fig. 2, at 10 in Fig. 6. In order to keep the frame 6 parallel at all times, check rods 11 and 12 are used. Two plates 13 and 14 are fastened to the frame 6 in any suitable manner, for example, by means of screws. Two similar plates 15 and 16 are rigidly fastened to the end casting 3 of the base 1. The plates 13, 14, 15 and 16, are so constructed as shown in Figs. 8, 9 and 10, that the check rods 11 and 12 can be easily slipped into and out of place therein. One simple arrangement for effecting this is shown perhaps best in Figs. 6 to 10 inclusive, wherein, for example, plates 15 and 16 differ in shape at their tops and ends, so that the end of the lever 11 fits thereover, as shown in Fig. 8, and the ends of check rod 12 extend through an orifice 17 afforded therefor between the plates 15 and 16, as shown in Figs. 9 and 10. The usual dash pot 18 is supported by the base 1, and is fastened by the piston rod 19 to the platter plate 9. In Fig. 7 the part designated by reference numeral 20 is in effect a cover which moves up and down over the top part of the shell 3, with the platter rest 9, thereby making the base dust-proof. Reference numeral 21 designates a depression formed in the base 1, which is employed as a third foot or support for the scale, preferably at the rear of the mechanism, the other two feet or rests being indicated at 22. The rest 21 is preferably a depression not only because of the simplicity of construction resulting therefrom, i. e., enabling the base to be a stamping, but also is gives extra room for the lever 4 to operate in. The end of the lever 4 is connected by the thermostatically controlled arrangement to be hereinafter described and through the medium of the actuating rod 23 containing the usual rack teeth 24 which mesh with the gear wheel 25, which controls the graduated scale member 26 which rotates within the casing 27 mounted upon the post 2.

I will now describe the connection between the frame 6 and the lever 4, which has been briefly designated by reference numeral 7, and which has been shown more clearly in detail in Figs. 4 and 5. Lever 4 has secured thereto the agate pivot 30 which acts as a hanger for a saddle 31. The saddle 31 at its lower end is pivotally supported as at 32 by the end of the frame 6. This structure is of course duplicated on both sides of the lever 4, as will be readily understood.

I will now describe the thermostat employed in accordance with my invention, and which, while illustrated in Fig. 2, is illustrated in detail in Figs. 11 to 15 inclusive. In this arrangement reference numeral 40 designates the steel yard arm which is secured in any suitable manner, for example, screwed, into the cap 41 at the bottom of spring 42. Reference numeral 43 designates a connection fastened to the steel yard arm 40, and which has pivotally secured thereto at its other end the respective arms of a fork 44. The lower end of the fork arm 44 is pivotally secured to a member 45, which is likewise formed as a fork, between the arms of which the steel yard arm formed at its end into the hook 46 extends. The free ends of the fork member 45 have secured thereto one end of a thermostatic metal strip 47, and the metal strip is fastened securely to the member 45 at the point of jointure thereof. At its upper end the thermostatic strip 47 is fastened to a member 48, which is secured to the steel yard arm 40. With temperature variations the thermostatic metal 47 bends, and as the upper end thereof is securely fastened, the lower end thereof moves in one direction or the other, thereby shortening or lengthening the rod 23 in accordance with the direction of movement of the thermostatic metal 47, or, in other words, in accordance with whether the temperature change is to a cooler or warmer degree. As the springs employed in scales of this type shorten and stiffen in cold weather they draw up, drawing the check rod with it, and vice versa, with the result that the thermostat is designed and operates to compensate for these variations. This type of thermostat has numerous advantages over those heretofore employed in this art, the principal ones being that it is an exceedingly simple construction and employs only one connection with the lever of the weighing and indicating mechanism, and therefore is enabled to keep the scale reading correct at zero position, and at capacity position, and in consequence at intermediate positions.

Many modifications and changes in details will readily occur to those skilled in the art without departing from the spirit and scope of my invention as defined in the claims, and I desire to have the scale mechanism in its respective parts and in its entirety as herein shown and described regarded in the illustrative sense rather than in a limiting sense. Having, now, however, set forth the objects and nature of my invention, and having shown and described a structure embodying the principles thereof, what I claim as new and useful and of my own invention, and desire to secure by Letters Patent is,—

1. In a scale mechanism, the combination with a weight actuated lever, of a check rod formed in two parts, one above the lever and the other below it, a pivotal support for one end of said lever, a platter rest, and means for pivotally supporting said platter rest upon said lever both parts of said check rods being in substantial vertical alignment with said platter rest.

2. In a scale mechanism, the combination with a weight actuated lever provided with a fulcrum pivot intermediate its ends, of a check rod formed in two parts, one above the lever and the other below it, a platter rest pivotally supported by both parts of said lever, said check rod being longer than the distance between the platter rest pivot and the fulcrum pivot and in substantial vertical alignment with said platter rest.

3. In a scale mechanism, the combination with a weight actuated lever, of a check rod formed in two parts, one above the lever and the other below it, a pivotal support for one end of said lever, a platter rest, a pivot carried by said lever, a frame and a saddle pivotally carried by said frame and supported by said pivot, said platter rest being in turn supported by said frame.

4. In a scale mechanism, the combination with a weight actuated lever provided with a fulcrum pivot intermediate its ends, of a check rod formed in two parts, one above the lever and the other below it, a pivot carried by said lever, a frame and a saddle pivotally carried by said frame and supported by said pivot, said platter rest being in turn supported by said frame.

5. In a scale mechanism, the combination with a weight actuated lever, of a pair of substantially parallel check rods, one positioned above said lever and the other below the same, a platter rest, and means for indirectly supporting said platter rest by said lever whereby said platter rest exerts a pull on said lever from below the same.

6. In a scale mechanism, the combination with a weight actuated lever, of a pair of substantially parallel check rods, one positioned above said lever and the other below the same, a platter rest, and means for indirectly supporting said platter rest by said lever, said means having secured thereto a common anchor for said check rod.

7. In a scale mechanism, the combination with a weight actuated lever, of a pair of substantially parallel check rods one positioned above said lever and the other below the same, and means for securing the ends of said check rods together without attachment between said means and said lever.

8. In a scale mechanism, and in combination with a graduated scale member and a weight actuated rack rod for actuating the same, of a steelyard rod and spring, and a thermostat carried by said steelyard rod and connected to said rack rod for controlling the relative movement between the rack rod and said steelyard rod.

9. In a scale mechanism, and in combination with a graduated scale member and a weight actuated rack rod for actuating the same, of a steelyard rod and spring, and a thermostat carried by said steelyard rod and connected to said rack rod for varying the distance between said steelyard rod and said rack rod.

10. In a scale mechanism, and in combination with a graduated scale member and a weight actuated rack rod for actuating the same, of a steelyard rod and spring, and a thermostatic strip rigidly fastened at one end to said steelyard rod and connected at its other end to said rack rod for controlling the relative movement between said rods.

11. In a scale mechanism, and in combination with a graduated scale member and a weight actuated rack rod for actuating the same, of a steelyard rod and spring, and a thermostatic strip rigidly fastened at one end to said steelyard rod and connected at its other end to said rack rod for varying the distance between said steelyard rod and said rack rod.

12. In a scale mechanism, and in combination with a graduated scale member and a weight actuated rack rod for actuating the same, of a steelyard rod and spring, a lever connecting said rods, and a thermostatic device controlling the position of said lever.

13. In a scale mechanism, and in combination with a graduated scale member and a weight actuated rack rod for actuating the same, of a steelyard rod and spring, a lever connecting said rods, and a thermostatic device controlling the position of said lever, one end of said thermostatic device being rigidly secured to said steelyard arm.

14. In a scale mechanism, and in combination with a graduated scale member and a weight actuated rack rod for actuating the same, of a steelyard rod and spring, a lever pivotally connected to said rods, and a thermostatic device for controlling the position of said lever.

15. In a scale mechanism, and in combination with a graduated scale member and a weight actuated rack rod for actuating the same, of a steelyard rod and spring, a lever pivotally connected to said rods, and a thermostatic device for controlling the position of said lever, one end of said thermostatic device being rigidly secured to said steelyard arm.

16. In a scale mechanism and in combination with a graduated scale and a rack rod for actuating the same, a weight-actuated lever for controlling said rack rod, a casing for enclosing said rack rod, a casing for enclosing said weight-actuated lever, of a steelyard rod and spring located in said rack rod casing, a thermostat carried by said steelyard rod and connected to said rack rod for controlling the relative movement between said rack rod and said steelyard rod, and a passage between said casings through which to permit operative connection between said steelyard rod and said weight-actuated levers.

In testimony whereof I have hereunto set my hand May A. D., 1922.

LEONARD T. JOHNSON.